United States Patent
Chou et al.

(10) Patent No.: US 8,661,237 B2
(45) Date of Patent: Feb. 25, 2014

(54) SYSTEM AND METHOD FOR BOOTING A PLURALITY OF SERVERS FROM A SHARED BOOT IMAGE STORED ON A USB BOOT IMAGE SHARER

(75) Inventors: Le-Sheng Chou, Taoyuan County (TW); Wei-Yu Chien, New Taipei (TW)

(73) Assignee: Quanta Computer Inc., Taoyuan Shien (TW)

( * ) Notice: Subject to any disclaimer, the term of this patent is extended or adjusted under 35 U.S.C. 154(b) by 200 days.

(21) Appl. No.: 13/357,155

(22) Filed: Jan. 24, 2012

(65) Prior Publication Data

US 2013/0031343 A1    Jan. 31, 2013

(30) Foreign Application Priority Data

Jul. 25, 2011   (TW) ............................. 100126232 A

(51) Int. Cl.
  *G06F 9/24*        (2006.01)
  *G06F 15/177*      (2006.01)
(52) U.S. Cl.
  USPC ............... 713/2; 713/1; 709/217; 709/219; 709/220; 709/222
(58) Field of Classification Search
  USPC .............. 713/1, 2; 709/217, 219, 220, 222
  See application file for complete search history.

(56) References Cited

U.S. PATENT DOCUMENTS

| | | | | |
|---|---|---|---|---|
| 6,751,658 | B1 * | 6/2004 | Haun et al. | 709/222 |
| 7,546,450 | B2 * | 6/2009 | Danielsen | 713/2 |
| 7,555,568 | B2 * | 6/2009 | Huang | 710/4 |

FOREIGN PATENT DOCUMENTS

| | | |
|---|---|---|
| CN | 1322437 C | 6/2007 |
| TW | 201118729 A | 6/2011 |

* cited by examiner

*Primary Examiner* — Mark Connolly
(74) *Attorney, Agent, or Firm* — Rabin & Berdo, P.C.

(57) ABSTRACT

A computer system and an operation system loading method thereof are provided. The computer system comprises a universal serial bus (USB) storage device storing a boot image, servers and a boot image sharer comprising USB ports, a memory, a first USB host controller and a micro-processor. The micro-processor controls the first USB host controller to emulate each USB port to the USB storage device, and stores the boot image to memory, such that the boot image is shared to the USB ports. The servers are respectively coupled to the USB ports, wherein each server comprises a second USB host controller and a basic input output system (BIOS). The second USB host controller is coupled to one of the USB ports. The BIOS reads the boot image from the emulated USB storage device and loads an operation system according to the boot image.

14 Claims, 3 Drawing Sheets

SYSTEM AND METHOD FOR BOOTING A PLURALITY OF SERVERS FROM A SHARED BOOT IMAGE STORED ON A USB BOOT IMAGE SHARER

This application claims the benefit of Taiwan application Serial No. 100126232, filed Jul. 25, 2011, the subject matter of which is incorporated herein by reference.

BACKGROUND OF THE INVENTION

1. Field of the Invention

The invention relates in general to a computer system and an operation system loading method thereof, and more particularly to a computer system which loads an operation system to several servers with one single USB storage device and an operation system loading method thereof.

2. Description of the Related Art

Referring to FIG. 1, a conventional rack server is shown. According to the design of the conventional rack server, the operation system of each server 11 is normally loaded to a hard disc drive 111 (such as SATA or SAS) of a server host or a virtual network drive (such as iSCSI).

However, the operation system loaded to the hard disc drive is special and exclusive software and operates independently from the operation systems of other servers, and the maintenance personnel must adopt a one-to-one operation mode when installing, setting and servicing the operation systems of all servers of the rack server. The tasks ranging from updating the operation system to the task of shooting one single problem are all complicated and time-consuming.

SUMMARY OF THE INVENTION

The invention is directed to a computer system and an operation system loading method thereof.

According to one embodiment of the present invention, a computer system is provided. The computer system comprises a universal serial bus (USB) storage device, a boot image sharer and a plurality of servers. The USB storage device stores the boot image. The boot image sharer comprises a plurality of USB ports, a memory, a first USB host controller and a micro-processor. The micro-processor controls the first USB host controller to emulate each USB port to the USB storage device, and stores the boot image to memory, such that the boot image is shared to the USB ports. The servers are respectively coupled to the USB ports, wherein each server comprises a second USB host controller and a basic input output system (BIOS). The second USB host controller is coupled to one of the USB ports. The BIOS reads the boot image from the emulated USB storage device and loads an operation system according to the boot image.

According to another embodiment of the present invention, an operation system loading method of a computer system is provided. The computer system comprises a universal serial bus (USB) storage device, a boot image sharer and a plurality of servers. The USB storage device stores a boot image. The boot image sharer comprises a plurality of USB ports, a memory, a first USB host controller and a micro-processor. The servers are respectively coupled to the USB ports, and each server comprises a second USB host controller and a basic input output system (BIOS). The second USB host controller is coupled to one of the USB ports. The operation system loading method comprises: controlling the first USB host controller by the micro-processor to emulate each USB port to the USB storage device and store the boot image to the memory, such that the boot image is shared to the USB ports; reading the boot image from the emulated USB storage device and loading the operation system according to the boot image by the BIOS.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
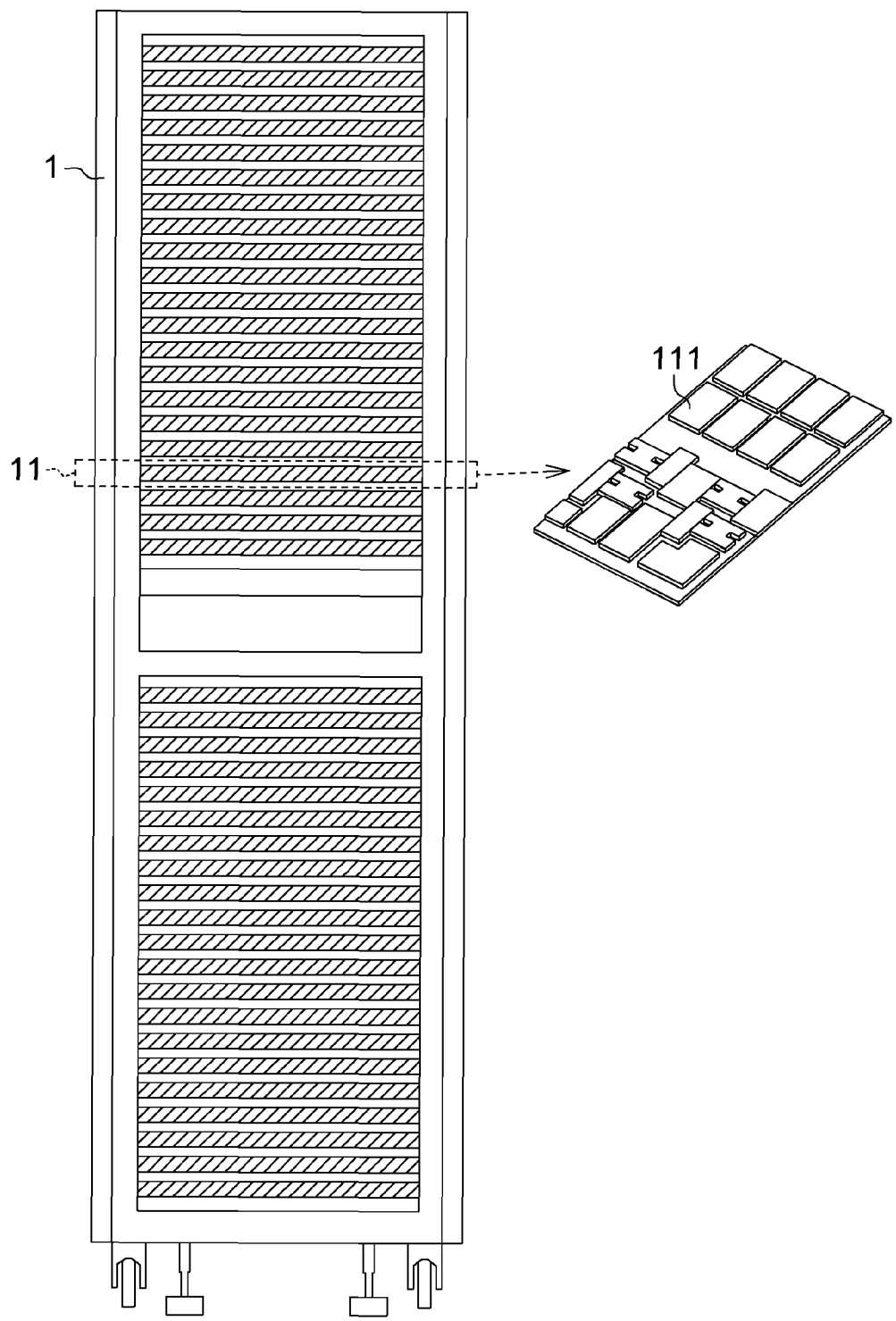
FIG. 1 shows a conventional rack server.
Figure 2:
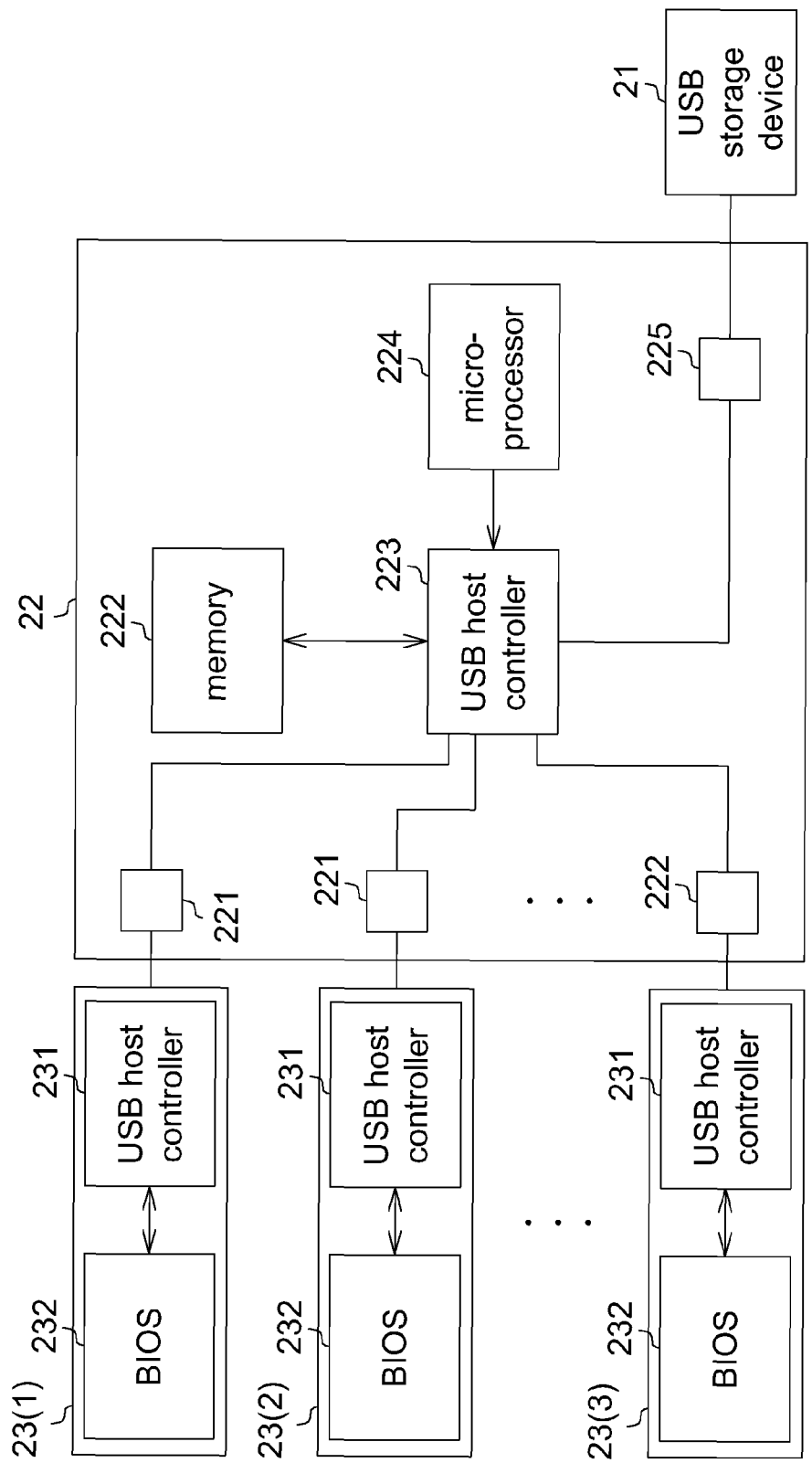
FIG. 2 shows a computer system according to one embodiment of the invention.

Referring to FIG. 2, a computer system according to one embodiment of the invention is shown. The computer system 2 comprises a universal serial bus (USB) storage device 21, a boot image sharer 22 and servers 23(1)~23(n), wherein n is a positive integer not equal to 0. The servers 23(1)~23(n) such as form a rack server. The USB storage device 21 stores a boot image. The boot image being an operation system not exclusive to specific computer hardware is such as Linux operation system or other free operation system with open source code.

The boot image sharer 22 comprises a USB ports 221, a memory 222, a USB host controller 223, a micro-processor 224 and a USB port 225. The USB host controller 223 is coupled to the USB port 221, the memory 222, the micro-processor 224 and the USB port 225. The servers 23(1)~23(n) are respectively coupled to the USB port 221, and the USB storage device 21 is coupled to the USB port 225. It is noted that the USB storage device 21 can be directly integrated to the boot image sharer 22 without using an extra USB port 225. Besides, after the servers 23(1)~23(n) are booted, the micro-processor 224 initializes the USB host controller 223 synchronically. Each of the servers 23(1)~23(n) comprises a USB host controller 231 and a BIOS 232.

Figure 3:
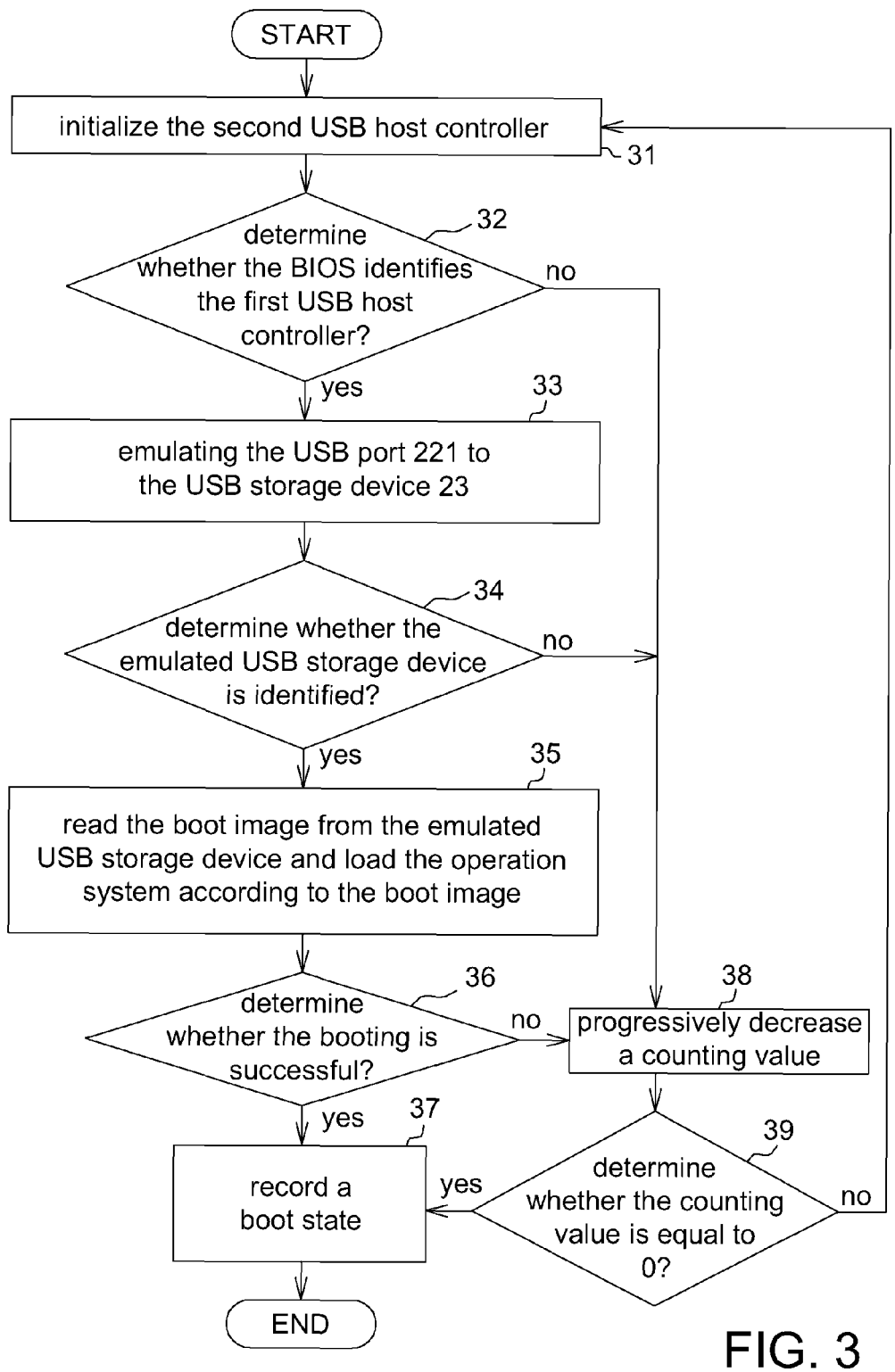
FIG. 3 shows a flowchart of an operation system loading method according to one embodiment of the invention.

Referring to both FIG. 2 and FIG. 3. FIG. 3 shows a flowchart of an operation system loading method according to one embodiment of the invention. The operation system loading method used in the computer system 2 comprises the following steps. Firstly, the method begins at step 31, the USB host controller 231 is initialized by the BIOS 232. Next, the method proceeds to step 32, whether the BIOS 232 identifies the USB host controller 223 is determined. If the USB host controller 223 is not identified by the BIOS 232, then the method proceeds to step 38, a counting value is progressively decreased. Then, the method proceeds to step 39, whether the counting value is equal to 0 is determined. If the counting value is equal to 0, then the method proceeds to step 37, a boot state is recorded. To the contrary, if the counting value is not equal to 0, then steps 31 and 32 are repeated.

If the BIOS 232 identifies the USB host controller 223, then the method proceeds to step 33, the USB host controller 223 is controlled by the micro-processor 224 to emulate the USB port 221 to the USB storage device 23. For emulating the USB port 221 to the USB storage device 23, the micro-processor 224 controls the USB host controller 223 to store the boot image to the memory 222, such that the boot image is shared to the USB port 221. Then, the method proceeds to step 34, whether the emulated USB storage device is identified by the BIOS 232 is determined. If the BIOS 232 does not identify the emulated USB storage device, then the method proceeds to step 38. To the contrary, if the BIOS 232 identifies the emulated USB storage device, then the method proceeds to step 35, the emulated USB storage device is set as the first boot sequence by the BIOS 232.

Then, the method proceeds to step 35, the boot image is read from the emulated USB storage device by the BIOS 232 and an operation system is loaded by the same according to the boot image. Furthermore, the BIOS 232 reads a boot loader from a master boot record (MBR) of the emulated USB storage device according to the interruption function of the INT 13 and passes the control right. The boot loader starts to read and decompress the kernel of the operation system to the host memory of the servers 23(1)~23(n). The BIOS 232 uses the kernel to test and drive the peripheral devices such as a central processing chip set and a network car. After the host memory of the servers 23(1)~23(n) decompresses the Intrid into a root directory, the kernel immediately loads a corresponding driver. After the operation system completes the setting of the peripheral devices, the storage device of a local area network (LAN) can be connected to the servers via an intranet and used as a data application center or other servers.

Then, the method proceeds to step 36, whether the booting is successful is determined by the BIOS 232. If the booting is not successful, then the method proceeds to step 38. To the contrary, the booting is successful, then the method proceeds to step 37, a boot state is recorded by the BIOS 232.

According to the computer system and the operation system loading method thereof disclosed in above embodiments of the invention, the boot image sharer enables several servers to share one single USB storage device. The operation system is pre-installed in one single USB storage device so as to be shared to several servers. After the servers are booted, the storage device of an LAN can be connected to the servers via an intranet and used as a permanent data read/write space. Thus, the number of hard disc drives of the servers is decreased, the required time and complexity for installing, setting and servicing the operation system of all servers reduced, and the management efficiency is largely increased.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer system, comprising:
   a universal serial bus (USB) storage device for storing a boot image;
   a boot image sharer, comprising:
      a plurality of USB ports;
      a memory;
      a first USB host controller; and
      a micro-processor for controlling the first USB host controller to emulate each USB port to the USB storage device and store the boot image to the memory, such that the boot image is shared to the USB ports; and
   a plurality of servers respectively coupled to the USB ports, wherein each server comprises:
      a second USB host controller coupled to one of the USB ports; and
      a basic input output system (BIOS) for reading the boot image from the emulated USB storage device and loading an operation system according to the boot image.

2. The computer system according to claim 1, wherein the boot image sharer comprises:
   a second USB ports for coupling to the USB storage device.

3. The computer system according to claim 1, wherein the BIOS initializes the second USB host controller, and the first USB host controller emulates each USB port to the USB storage device when the BIOS identifies the first USB host controller.

4. The computer system according to claim 3, wherein when identifying the emulated USB storage device, the BIOS reads the boot image from the emulated USB storage device, and loads the operation system according to the boot image.

5. The computer system according to claim 4, wherein the BIOS records a boot state after the system is booted successfully.

6. The computer system according to claim 1, wherein the BIOS sets the emulated USB storage device as the first boot sequence.

7. The computer system according to claim 1, wherein the BIOS reads a boot loader from a master boot record (MBR) of the emulated USB storage device.

8. An operation system loading method of a computer system, wherein the computer system comprises a universal serial bus (USB) storage device, a boot image sharer and a plurality of servers, the USB storage device stores a boot image, the boot image sharer comprises a plurality of USB ports, a memory, a first USB host controller and a microprocessor, the servers are respectively coupled to the USB ports, each server comprises a second USB host controller and a basic input output system (BIOS), the second USB host controller is coupled to one of the USB ports, and the operation system loading method comprises:
   controlling the first USB host controller by the microprocessor to emulate each USB port to the USB storage device and store the boot image to the memory, such that the boot image is shared to the USB ports; and
   reading the boot image from the emulated USB storage device and loading the operation system according to the boot image by the BIOS.

9. The operation system loading method according to claim 8, wherein the boot image sharer comprises:
   a second USB ports for coupling to the USB storage device.

10. The operation system loading method according to claim 8, wherein the emulating step comprises:
    initializing the second USB host controller;
    determining whether the BIOS identifies the first USB host controller; and
    emulating each USB port to the USB storage device by the first USB host controller when the BIOS identifies the first USB host controller.

11. The operation system loading method according to claim 10, wherein the reading step comprises:
    determining whether the BIOS identifies the emulated USB storage device; and
    reading the boot image from the emulated USB storage device and loading the operation system according to the boot image when the BIOS identifies the emulated USB storage device.

12. The operation system loading method according to claim 11, further comprising:
    recording a boot state by the BIOS after the system is booted.

13. The operation system loading method according to claim 8, wherein the BIOS sets the emulated USB storage device as the first boot sequence.

14. The operation system loading method according to claim 8, wherein the BIOS reads a boot loader from a master boot record (MBR) of the emulated USB storage device.

\* \* \* \* \*